O. MÜLLER.
APPARATUS FOR DRYING PASTE GOODS.
APPLICATION FILED SEPT. 27, 1911.
1,089,944.
Patented Mar. 10, 1914.
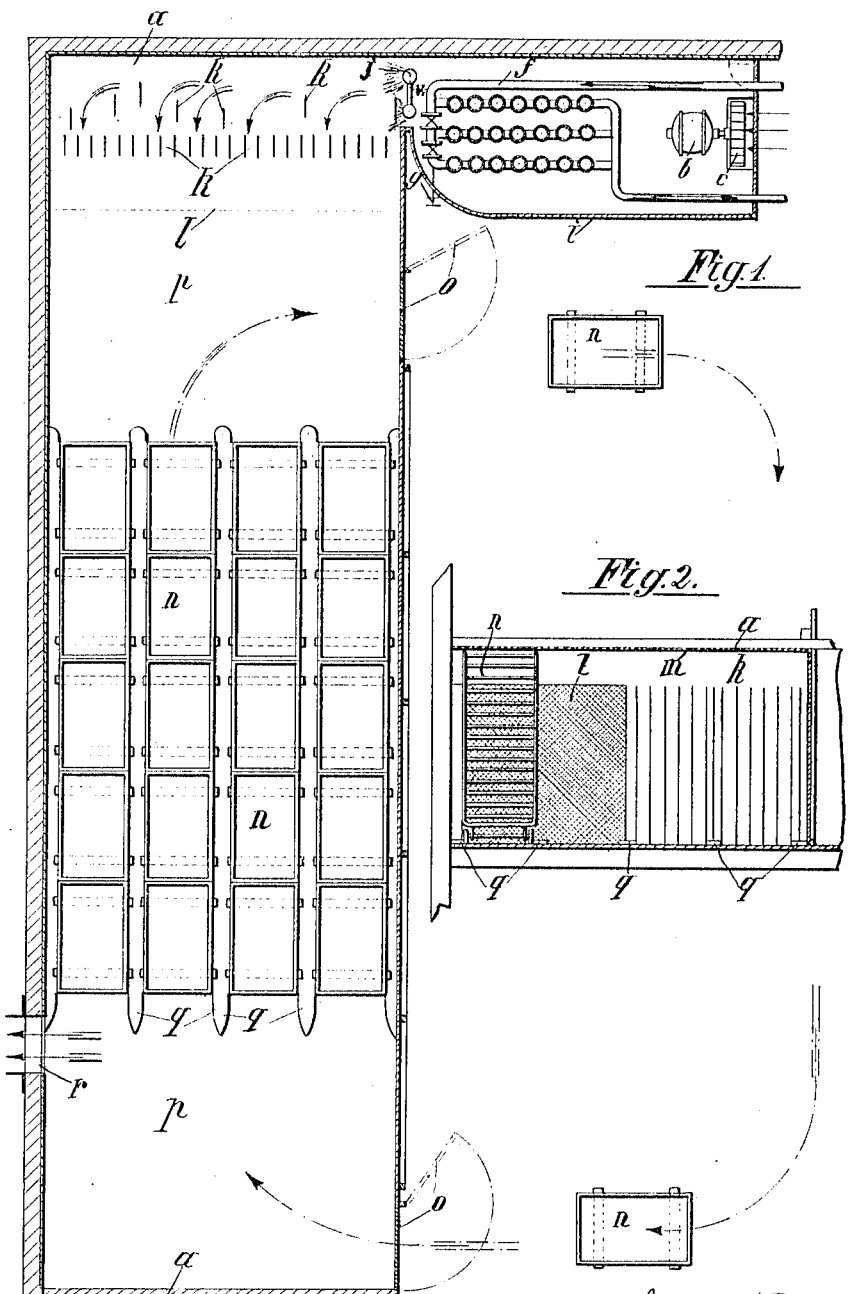

UNITED STATES PATENT OFFICE.

OSCAR MÜLLER, OF PLÜDERHAUSEN, GERMANY.

APPARATUS FOR DRYING PASTE GOODS.

1,089,944. Specification of Letters Patent. Patented Mar. 10, 1914.

Application filed September 27, 1911. Serial No. 651,611.

*To all whom it may concern:*

Be it known that I, OSCAR MÜLLER, a citizen of the German Empire, residing at Plüderhausen, in the Kingdom of Wurttemberg, Germany, (whose post-office address is care of Walter Schwaebsch, No. 44 Schlossstrasse, Stuttgart, Germany,) have invented certain new and useful Improvements in Apparatus for Drying Paste Goods; and I do hereby declare the following to be a full, clear, and exact description of the invention, such as will enable others skilled in the art to which it appertains to make and use the same.

Macaroni and like paste goods have hitherto been artificially dried almost exclusively by being exposed to great heat or a current of compressed air. As no provision is made during the drying for uniformly and thoroughly ventilating or aerating the material to be dried and the moisture expelled from the goods is further employed in the drying process, an article, the condition and flavor of which is not free from objection, is usually produced by this known drying process, so that no goods could hitherto be produced by artificial drying which were as good as the paste goods which in the ordinary way are dried exclusively in the open air during the favorable months of the year, for instance in southern Italy.

Now this invention has for its object to carry out the artificial drying of paste goods in such a way that their flavor and condition are as fully retained as when dried in the open air.

The invention consists in the paste goods being arranged in tiers of layers one behind the other and gradually move forward in the opposite direction to a current of fresh air tempered to correspond with the natural air temperature, so that the fresh goods are preliminarily dried by the tempered fresh air coming from the dried goods and are very gradually completely dried in quite fresh suitably tempered air in proportion as they are moved forward against the air current.

For carrying out the improved process, a passage or tunnel is employed which is accessible at both ends and over the entire area of which, tempered fresh air uniformly passes, through which passage the drying frame trucks or the like serving for receiving the paste goods are gradually passed, the fresh goods being introduced at one end of the passage and the finished goods removed at the other end, whereupon the trucks are discharged and may be loaded with fresh goods, in order to be then again introduced into the passage. The trucks thus move in a constant circulation from one end of the passage to the other and back again to the first end.

In order to better explain the invention reference will now be made to the accompanying drawings, in which one form of construction of the apparatus for carrying out the process is shown.

Figure 1 is a plan view and plan section; and Fig. 2, a cross section of the apparatus.

At one end of a drying passage $a$ an apparatus is provided for producing a current of fresh air corresponding in temperature to that of the natural air. The fresh air is drawn in by means of a fan $c$ operated by an electromotor $b$ and first conveyed over a heating appliance $d$ which consists of corrugated pipes. The amount of heat given off by the heating device $d$ may be regulated by means of valves $e$ which are arranged in the feed pipe $f$ and may be operated by means of hand wheels $g$ which are accessible from the outside of the heating chamber $i$ in such a way that the tempered air corresponds to the temperature of natural air in the summer months.

In order if necessary to be able to moisten the tempered fresh air, sprinkling nozzles $j$ are provided at the place at which the air enters the passage $a$, from which nozzles steam or water may be discharged. The sprinkling nozzles are preferably placed in a casing of permeable, gauze-like material.

In order to uniformly distribute the tempered fresh air over the entire area of the passage $a$, baffle plates $k$ are arranged in zigzags in the way of the air current between which plates the air must flow and is divided into separate layers which fill up the area of the passage uniformly. A small meshed net $l$ is arranged behind the baffle plates $k$, in order to render more uniform and for damping the current of tempered fresh air. The network $l$ and the baffle plates $k$ do not extend quite to the roof $m$ of the passage $a$, so that tempered fresh air can freely flow along the roof of the passage.

Free spaces $p$ are left near the doors $o$ provided for the introduction and removal of the trucks $n$ in the passage $a$, which spaces are usually not filled with the goods to be dried, and serve on the one hand for the convenient introduction and removal of the drying frame trucks n on the rails q on the floor of the passage and on the other hand for steadying and checking the current of tempered fresh air. The fresh air therefore flows as a quite gentle hardly appreciable current between the drying frames and escapes through an aperture r which is not placed at the end of the passage a but at a little distance from it, so that the air at the end of the passage must to a certain extent be arrested and escapes quite gently and gradually through the outlet aperture r. The air escaping through the aperture r from the drying passage a can also be further conveyed through a narrow flue lying along the passage, before it emerges into the open air.

As the finished articles are removed from one end of the passage, fresh goods are introduced at the other end, the freshly loaded drying frame trucks being pushed against the trucks already standing in the passage, so that when a fresh truck is introduced into the passage, the train of trucks is moved forward, against the current of tempered fresh air, approximately to the length of one truck. The trucks removed from the passage with dry goods are preferably discharged near the passage and then reloaded with fresh damp goods, conveyed to the other end of the passage and again introduced therein, so that the drying frame trucks n move constantly in a circular course which is indicated in the drawings by the arrows drawn with broken lines.

As many trucks may be placed in the passage as the width and length of the passage allows and they may be arranged against one another in suitable transverse and longitudinal rows of suitable length.

I declare that what I claim is:—

1. In an apparatus for drying paste goods, a drying chamber having dead spaces p at opposite ends, and a central receiving portion between the spaces, an inlet in said chamber for admitting air, means exterior of said chamber for controlling the temperature of said air, an air outlet communicating with the dead space remote from said inlet, a feed and a discharge opening in said chamber on both ends of said receiving portion, and means between said air inlet and said feed opening for breaking down the air current.

2. In an apparatus for drying paste goods, a drying chamber having the dead spaces p on the chamber ends, and a central receiving portion between the spaces, an air inlet in the said chamber connected to an air supply and adapted to convey tempered air into the said chamber, means for controlling the temperature of the air between the air supply and the air inlet, a moistening device in the said air inlet, an air outlet communicating with the dead space p located remote from the air inlet, a feed and a discharge opening in the said chamber on both ends of the said receiving portion, baffle plates between the said air inlet and the said feed opening, and an air distributing device between the baffle plates and the said feed opening.

3. In an apparatus for drying paste goods, a drying chamber having the dead spaces p on the chamber ends, and a central receiving portion between these spaces, an air inlet in said chamber connected to an air supply, and adapted to convey tempered air into the said chamber, means for controlling the temperature of the air between the air supply and the air inlet, a moistening device in the said air inlet, a feed and a discharge opening in the said chamber on both ends of the said receiving portion, an air outlet arranged opposite to the said discharge opening and communicating with the dead space p located remote from the air inlet, baffle plates between the said air inlet and the said feed opening, an air distributing device between the baffle plates and the said feed opening, and an unobstructed air passage between the said baffle plate and distributing device, and the top wall of the said chamber.

In testimony whereof I affix my signature, in presence of two witnesses.

OSCAR MÜLLER.

Witnesses:
GEORG HAUPTMAN,
PAULINE KLAIBER.